United States Patent
Schlecht et al.

(10) Patent No.: US 9,222,556 B2
(45) Date of Patent: Dec. 29, 2015

(54) SPINDLE DRIVE HAVING ANTI-TURN MECHANISM

(75) Inventors: Christian Schlecht, Tegernheim (DE); Jürgen Stürzer, Aiterhofen (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 13/123,837

(22) PCT Filed: Sep. 25, 2009

(86) PCT No.: PCT/EP2009/062458
§ 371 (c)(1), (2), (4) Date: Apr. 12, 2011

(87) PCT Pub. No.: WO2010/043484
PCT Pub. Date: Apr. 22, 2010

(65) Prior Publication Data
US 2011/0265588 A1    Nov. 3, 2011

(30) Foreign Application Priority Data
Oct. 14, 2008  (DE) .......................... 10 2008 051 544

(51) Int. Cl.
F16H 25/20   (2006.01)

(52) U.S. Cl.
CPC .......... *F16H 25/20* (2013.01); *F16H 2025/204* (2013.01); *F16H 2025/2081* (2013.01); *Y10T 29/49462* (2015.01); *Y10T 74/18648* (2015.01); *Y10T 74/18656* (2015.01)

(58) Field of Classification Search
CPC ..... F16H 25/20; F16H 25/24; F16H 25/2015; F16H 25/2204; F16H 25/2454; F16H 57/0497; F16H 57/0406; F16H 19/06; F16H 2025/204; F16H 2025/2081; F16H 2025/2084; F16H 2025/209; F16H 2025/2445; F16H 2025/2463; F16H 2025/2075

USPC .................. 29/227, 893, 230; 74/89.3–89.39, 74/424.92; 254/10.5; 279/158, 902; 384/114, 26
See application file for complete search history.

(56) References Cited

U.S. PATENT DOCUMENTS 4,019,750 A * 4/1977 Wiegard ........................ 267/160
4,076,109 A * 2/1978 Bencini ........................ 192/48.4
(Continued)

FOREIGN PATENT DOCUMENTS

DE          10030140 A1    1/2001 .............. F16H 25/20
DE    202006014177 U1   11/2006 .............. B25B 27/02
(Continued)

OTHER PUBLICATIONS

International PCT Search Report and Written Opinion, PCT/EP2009/062458, 11 pages, Jan. 18, 2010.
(Continued)

*Primary Examiner* — William Kelleher
*Assistant Examiner* — Emily Cheng
(74) *Attorney, Agent, or Firm* — Slayden Grubert Beard PLLC

(57) ABSTRACT

A spindle drive has a spindle nut (1) and a threaded spindle (2) mounted in a rotationally fixed and axially displaceable manner on a reference body (3) by way of a linear guide, wherein the axis (9) of the threaded spindle (2) is arranged parallel to the longitudinal direction of the linear guide, and wherein the linear guide has a groove (4) and a guide element (5) engaging in the groove and comprises an elastic region (5*b*, 5*b'*, 5*b''*), the width of which perpendicular to the longitudinal direction of the linear guide is greater than the maximum groove width in the region used for the linear guide.

13 Claims, 4 Drawing Sheets

(56) References Cited

U.S. PATENT DOCUMENTS

| | | | |
|---|---|---|---|
| 4,447,178 A * | 5/1984 | Esser | 409/80 |
| 4,623,207 A * | 11/1986 | Sasaki et al. | 439/59 |
| 5,261,372 A * | 11/1993 | Traeger et al. | 123/357 |
| 5,573,311 A * | 11/1996 | Clohessy | 301/105.1 |
| 5,761,963 A | 6/1998 | Hartwig | 74/89.37 |
| 5,832,779 A * | 11/1998 | Madrid et al. | 74/89.39 |
| 5,865,272 A * | 2/1999 | Wiggins et al. | 185/40 R |
| 6,244,749 B1 * | 6/2001 | Nakagawa et al. | 384/114 |
| 6,315,451 B1 | 11/2001 | Michioka et al. | 384/42 |
| 6,484,678 B2 * | 11/2002 | Kinugawa | 123/90.17 |
| 6,540,539 B2 * | 4/2003 | Yahiro et al. | 439/326 |
| 6,595,327 B2 * | 7/2003 | Keller | 184/5 |
| 7,047,833 B2 * | 5/2006 | Durschmied | 74/89.32 |
| 7,062,985 B2 * | 6/2006 | Bauer | 74/89.32 |
| 7,073,406 B2 * | 7/2006 | Garrec | 74/89.34 |
| 7,237,448 B2 * | 7/2007 | Bauer | 74/89.32 |
| 7,278,189 B2 * | 10/2007 | Smith | 24/295 |
| 7,291,946 B2 * | 11/2007 | Clouse et al. | 310/51 |
| 7,441,956 B2 * | 10/2008 | Koeniger et al. | 384/45 |
| 8,049,971 B2 * | 11/2011 | Jung et al. | 359/694 |
| 2002/0194783 A1 * | 12/2002 | Stojc et al. | 49/118 |
| 2003/0083136 A1 * | 5/2003 | Park | 464/162 |
| 2004/0093969 A1 * | 5/2004 | Nielsen | 74/89.23 |
| 2006/0144179 A1 * | 7/2006 | Greilinger et al. | 74/89.23 |
| 2008/0302624 A1 * | 12/2008 | Steinz et al. | 192/53.341 |
| 2011/0265588 A1 * | 11/2011 | Schlecht et al. | 74/89.32 |

FOREIGN PATENT DOCUMENTS

| | | | |
|---|---|---|---|
| DE | 102005057227 A1 * | 5/2007 | F16H 25/20 |
| EP | 0509362 | 10/1992 | B61D 23/02 |
| EP | 0612651 | 8/1994 | B62D 5/04 |

OTHER PUBLICATIONS

German Office Action, German Patent application No. 102008051544.2-12, 4 pages, Apr. 7, 2009.

* cited by examiner

SPINDLE DRIVE HAVING ANTI-TURN MECHANISM

CROSS-REFERENCE TO RELATED APPLICATIONS

This application is a U.S. National Stage Application of International Application No. PCT/EP2009/062458 filed Sep. 25, 2009, which designates the United States of America, and claims priority to German Application No. 10 2008 051 544.2 filed Oct. 14, 2008, the contents of which are hereby incorporated by reference in their entirety.

TECHNICAL FIELD

The invention relates to a linear guide for a threaded spindle of a spindle drive.

BACKGROUND

For the linear displacement of articles, spindle drives may be used, in which the spindle nut is driven in order to displace the threaded spindle linearly along its axis. In order to achieve a direct conversion of spindle nut rotation into a longitudinal displacement of the threaded spindle, it is necessary to ensure that the threaded spindle does not corotate with the spindle nut. For this purpose, the threaded spindle is usually arranged fixedly in terms of rotation on a reference body which, furthermore, is configured such that it does not impede the rotation of the spindle nut. The reference body may be formed by any desired body, for example by a housing or a frame or else simply by the article to be displaced.

A rotationally fixed arrangement of the threaded spindle on the reference body can be achieved by means of a form fit of the threaded spindle with the reference body, in which, for example, a pin-shaped or wing- or fin-shaped element engages into a longitudinally running groove such that said element can be displaced along the groove, but not transversely with respect to the groove. In order to ensure unimpeded longitudinal displacement of the threaded spindle, the longitudinal direction of the groove is oriented or arranged parallel to the axis of the threaded spindle. Parallel arrangement is also understood in this context to mean the coincidence of the longitudinal direction of the groove with the axis of the threaded spindle. The groove and the element engaging therein together form a longitudinal guide.

The fit between the groove and the element engaging therein must be selected with a view to low conversion losses, such that as little friction as possible occurs. This usually leads to a play which may generate noise when the spindle drive is being used. Furthermore, for reasons of cost, groove geometries which can easily be shaped are mostly selected. Often, for shaping purposes, a mold removal slope is necessary, which leads to a variation in the groove width in the groove longitudinal direction. The play necessitated as a result usually causes an appreciable amount of noise to be generated.

SUMMARY

According to various embodiments, a longitudinal guide can be specified in which an element engaging into a groove is guided, free of play, in the groove.

According to an embodiment, a spindle drive may comprise a spindle nut and with a threaded spindle mounted fixedly in terms of rotation and axially displaceably on a reference body by means of a linear guide, the axis of the threaded spindle being arranged parallel to the longitudinal direction of the linear guide, and the linear guide having a groove and a guide element which engages into the groove and which comprises an elastic region, of which the width transversely to the longitudinal direction of the linear guide is greater than the maximum groove width in the region used for linear guidance.

According to a further embodiment, the elastic region of the guide element may comprise a spring element. According to a further embodiment, the spring element may have two extensions which are connected to one another in a fork-shaped manner and are arranged such that the outer spacing of the free ends of the extensions transversely to the longitudinal direction of the linear guide in a non-loaded state is greater than the groove width in the region used for linear guidance. According to a further embodiment, the guide element may comprise a basic body which is designed to be connectable with a form fit to an attachment element comprising the elastic region. According to a further embodiment, the linear guide may comprise at least two grooves which are arranged parallel to one another and parallel to the axis of the threaded spindle. According to a further embodiment, the groove of the linear guide can be arranged on the reference body and the guide element is arranged on the threaded spindle. According to a further embodiment, the groove of the linear guide can be arranged on the threaded spindle and the guide element is arranged on the reference body. According to a further embodiment, the faces of the guide element which can be intended for contacting the side faces of the groove are designed as plastic surfaces.

BRIEF DESCRIPTION OF THE DRAWINGS

Further features may be gathered from the following description of exemplary embodiments in conjunction with the claims and the figures. In an embodiment, the individual features may be implemented in each case separately or severally. In the following explanation of some exemplary embodiments, reference is made to the accompanying figures of which

Identical or identically acting components are given the same reference symbols in the figures.

DETAILED DESCRIPTION

Figure 1:
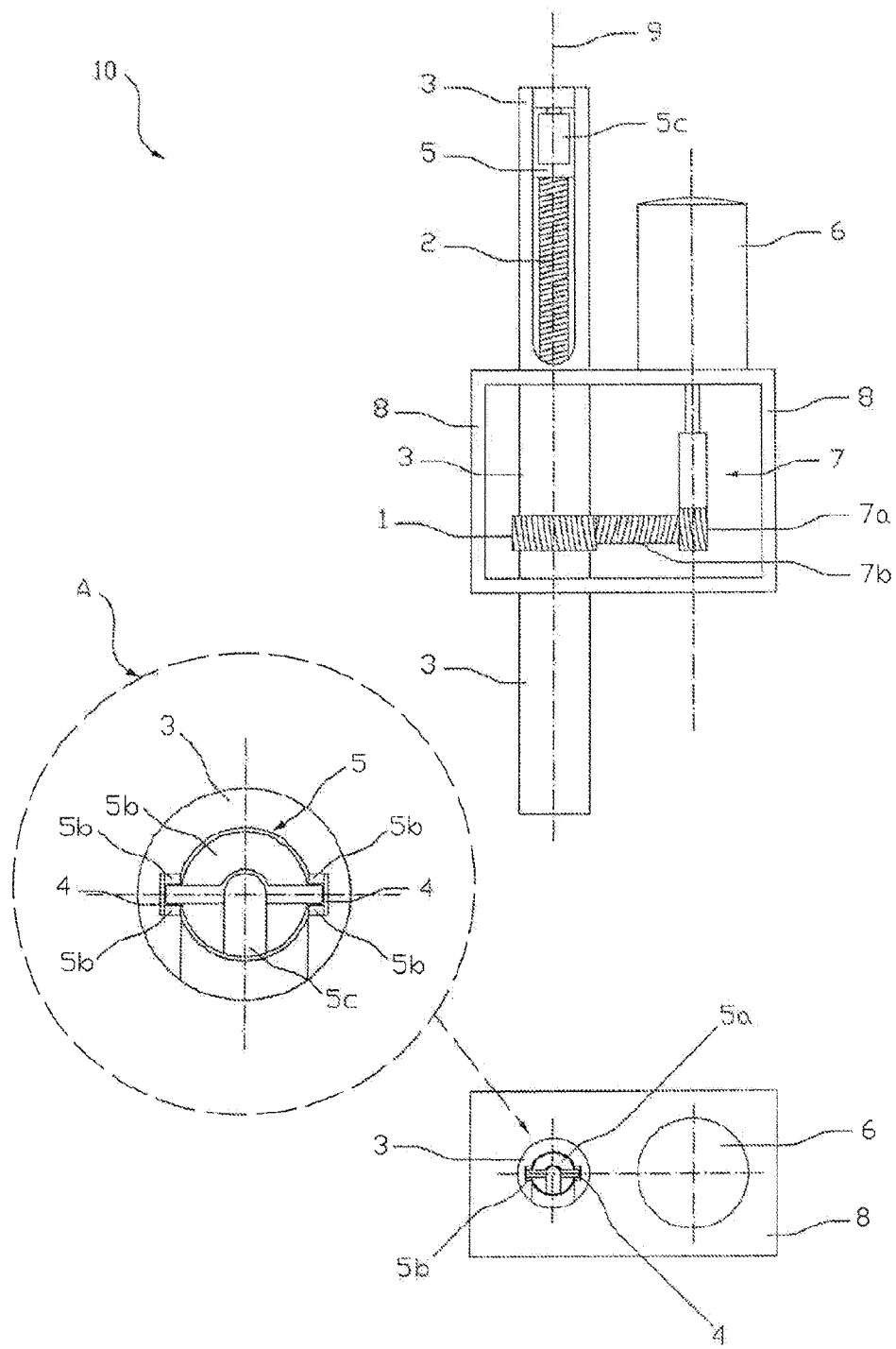
FIG. 1 shows a spindle drive in a top view and a side view.

According to various embodiments, a spindle drive comprises a spindle nut and a threaded spindle mounted fixedly in terms of rotation and axially displaceably on a reference body by means of a linear guide, the axis of the threaded spindle being arranged parallel to the longitudinal direction of the linear guide. The linear guide in this case has a groove and a guide element which engages into the groove and which comprises an elastic region, of which the width transversely to the longitudinal direction of the linear guide is greater than the maximum groove width in the region used for linear guidance.

In this regard, it is pointed out that the terms "comprise", "have", "contain" and "with" and their grammatical modifications, used in this description and in the claims for the purpose of listing features, generally designate a non-exhaustive list of features, such as, for example, method steps, devices, regions, sizes and the like, which in no way rules out the presence of other or additional features or groupings of other or additional features.

The spindle drive according to various embodiments makes it possible for the guide element always to be in contact with the groove flanks, with the result that a play-free linear guide is achieved and an oscillating movement of the spindle drive is damped. Since the oscillating movements are the cause of noise being generated, the generation of noise is minimized as a result of the damping of these movements. Furthermore, since a guide which is not free of play leads to increased wear, the above-designated spindle drive also has an enhanced high service life.

For the damped support of torque acting on the linear guide, the elastic region of the guide element preferably has a spring element. A version of the spring element in the form of two extensions connected to one another in a fork-shaped manner allows simple and cost-effective production. The two extensions connected to one another in a fork-shaped manner are in this case preferably arranged such that the outer spacing of the free ends of the extensions transversely to the longitudinal direction of the linear guide in a non-loaded state is greater than the groove width in the region used for linear guidance.

Particularly when the guide element assumes additional tasks, such as, for example, the transmission of force to a further article, the guide element may advantageously be designed in two parts, said guide element comprising a basic body which is designed to be connectable with a form fit to an attachment element having the elastic region.

For supporting greater torques, the linear guide expediently has at least two grooves which are arranged parallel to one another and parallel to the axis of the threaded spindle.

In one of the embodiments of the linear guide, the groove is arranged on the reference body and the guide element is arranged on the threaded spindle. In a further embodiment of the linear guide, the groove is arranged on the threaded spindle and the guide element is arranged on the reference body. If a plurality of grooves are used for the linear guide, some of the grooves may be arranged on the reference body and the guide elements engaging into these grooves may be arranged on the threaded spindle, while others of the grooves are arranged on the threaded spindle and the guide elements engaging into them are arranged on the reference body.

To achieve a low coefficient of friction between the guide element and the groove of the linear guide, at least those faces of the guide element which are intended for contacting the side faces of the groove are designed as plastic surfaces.

FIG. 1 shows a diagrammatical illustration of a spindle drive 10, the threaded spindle 2 of which can be displaced axially, and without being corotated, in a partially open housing 3 as a result of the rotation of the spindle nut 1. The spindle nut 1 of the spindle drive 10 is set in rotation by the drive 6, for example an electric motor. The gear 7 arranged between the drive 6 and the spindle nut 1 serves for stepping up the rotational speed of the drive 6 so as to meet the requirements of the spindle drive. The gear 7 illustrated in FIG. 1 comprises two helically toothed outer wheels 7a and 7b, the spindle nut 1 likewise having a helical toothing which engages into the wheel 7b. Other gear forms, such as inter alia, for example, worm gears, gears with inner wheel toothing, spur-toothed gears or the like, may, of course, likewise be used. Furthermore, the spindle nut 1 may also be designed in the form of a direct drive, for example as an element of a hollow shaft of the drive 6. The gear 7 is accommodated in a gear housing 8 which, furthermore, also serves as a holder for the spindle drive housing 3 and the preferably electric drive 6.

At the end of the spindle 2, a guide element 5 is arranged, which is rigidly connected to the spindle 2 or is integrally formed onto the latter. In the embodiment illustrated, the guide element 5 has a recess 5c into which part of an article to be displaced can be introduced.

In the lower part of FIG. 1, the spindle drive 10 is reproduced in a side view in which the linear guide can be seen in a front view. The view A of a detail shows the front view of the spindle drive linear guide on an enlarged scale. The spindle 2, concealed by the guide element 5 in the front view, is arranged in a spindle housing 3 which has two longitudinal grooves 4 lying opposite one another. In the exemplary embodiment illustrated, the longitudinal grooves 4 extend from the open end of the spindle housing 3 in the direction of the spindle nut 1. The grooves 4 formed in the spindle housing 3 are arranged both parallel to one another and parallel to the spindle axis 9. The selected length of the grooves 4 is usually somewhat greater than the displacement travel of the spindle 2 in the spindle housing 3.

The guide element 5 has a basic body 5a to which one or more elastic element(s) 5b is/are attached. In the mounted state, that is to say when the guide element 5 engages into the grooves 4, the elastic elements 5b bear against the side walls of the groove 4 which are also designated as groove flanks. In the situation presented in FIG. 1, the elastic element 5b has for each groove 4 two sliding elements which between them receive a projection formed on the basic body 5a.

In the non-mounted state, that is to say when the guide element 5 does not engage into the grooves 4, the spacing of the outer faces, lying opposite one another (vertically in the view A of the detail), of the two sliding elements is somewhat greater than the groove width which is defined as the spacing of the groove flanks lying opposite one another in the groove. As already mentioned, the spacing of the groove flanks may change in the longitudinal direction of the groove. In this case, the spacing of the two outer side faces of the respective sliding elements is greater than the maximum groove width in the displacement region. When the guide element 5 is being introduced into the grooves 4, the sliding elements are pressed together elastically, so that the guide element 5 bears, free of play, against the groove flanks.

When the spindle nut 1 is rotated, for example via the drive 6, the threaded spindle 2 connected rigidly to the guide element 5 is prevented from corotating by the above-described "tongue and groove connection". However, the form fit, brought about via the grooves 4, of the guide element 5 with the spindle housing 3 only prevents the threaded spindle 2 from being rotated in relation to the spindle housing 3. Longitudinal displacement, that is to say displacement of the threaded spindle along its axis, is not impeded on account of the arrangement of the grooves 4 with the groove longitudinal direction parallel to the axis 9 of the threaded spindle 2. The "tongue and groove connection" formed by the engagement of the guide element 5 into the grooves 4 with a form fit thus constitutes a linear guide which ensures that rotation of the spindle nut 1 is converted, free of play, into longitudinal displacement of the threaded spindle 2.

Figure 2:
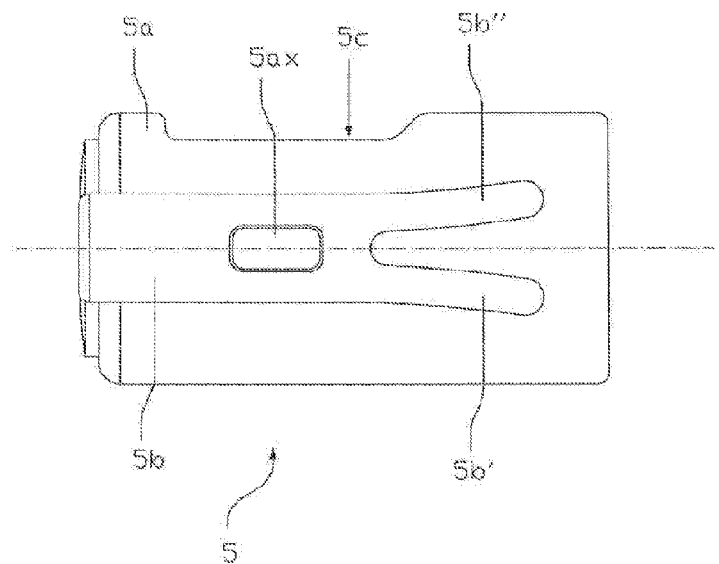
FIG. 2 shows a two-part version of the guide element.
Figure 3:
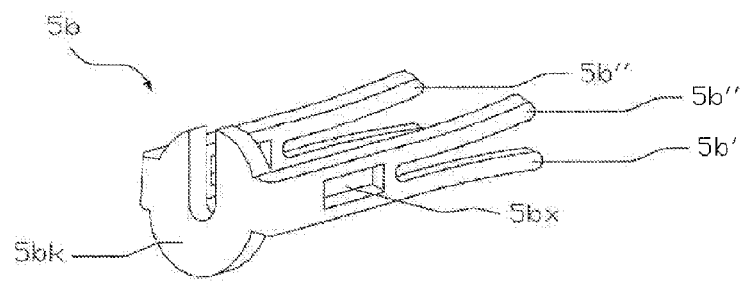
FIG. 3 shows the attachment element of the guide element of FIG. 2 in perspective and alone.

FIG. 2 shows an example of a guide element constructed in two parts in a side view. The guide element is composed of a basic body 5a and of an attachment 5b connected to the latter with a form fit. The attachment 5b is manufactured from an elastic material, preferably a plastic. FIG. 3 shows the elastic attachment 5b alone, that is to say without the basic body 5a. In the perspective illustration of FIG. 3, it can be seen that the attachment 5b of the guide element 5 has a head region 5bk which is flanked on both sides by two wing-shaped elements. The two wing elements adjoin the head region perpendicularly. Each of the two wing elements is subdivided into a front region adjoining the head region and a rear region adjoining said front region. The rear region has two extensions which are connected in a fork-shaped manner via the front region. The extensions are curved or inclined such that the spacing of their outwardly pointing sides increases with an increasing distance from the head part. In other words, the spacing of the mutually opposite outer faces of the two extensions 5b' and 5b" increases with the increasing proximity to the free end of the two extensions.

The attachment element 5b, illustrated in FIG. 3, of the guide element 5 has on each wing a mounting recess 5bx for receiving a mounting projection 5ax shaped on the basic body 5a of the guide element 5. The attachment 5b is manufactured from an elastic material and can therefore simply be pushed over the basic body 5a of the guide element 5 until the mounting projection 5ax engages into the mounting recess 5bx and thus makes a form fit.

The basic body 5a is fixedly connected to one end or shaped on the end of the spindle. The wing elements of the attachment element 5b in this case engage into the grooves 4 which are formed in the reference body 3 formed by the spindle housing. The width of the wing elements of the attachment element 5b is greater at the free ends of the two extensions 5b' and 5b" than the width of the groove 4, that is to say greater than the spacing of the groove flanks. When the wing elements are being introduced into the groove 4, the two extensions 5b' and 5b" are therefore pressed together elastically, with the result that they generate spring force which ensures that the extensions are constantly pressed against the groove flanks. When the spindle nut 1 is rotated, torque is transmitted to the threaded spindle 2 on account of the friction occurring between the spindle rod 1 and the threaded spindle 2. Via the form fit between the basic body 5a and the attachment element 5b, this torque is also transmitted to the wing elements of the attachment 5b which are introduced in the groove 4, with the result that the pressure on one of the extensions 5b' or 5b" rises. As a result, one of the extension elements is loaded, while the other extension element relaxes somewhat on account of the spring action specific to it, although it continues to bear against the groove flank. The wing elements of the attachment 5b are therefore always in direct contact with the groove flanks via the two extensions 5b' and 5b", so that, when torque is transmitted to the threaded spindle 2, the lateral flanks of a wing element cannot butt against the groove flanks. Thus, by the extension elements being spread apart, the wing elements of the attachment element 5b are brought to bear gently against the groove flanks and noise-minimized linear guidance of the threaded spindle is thereby achieved.

Figure 4:
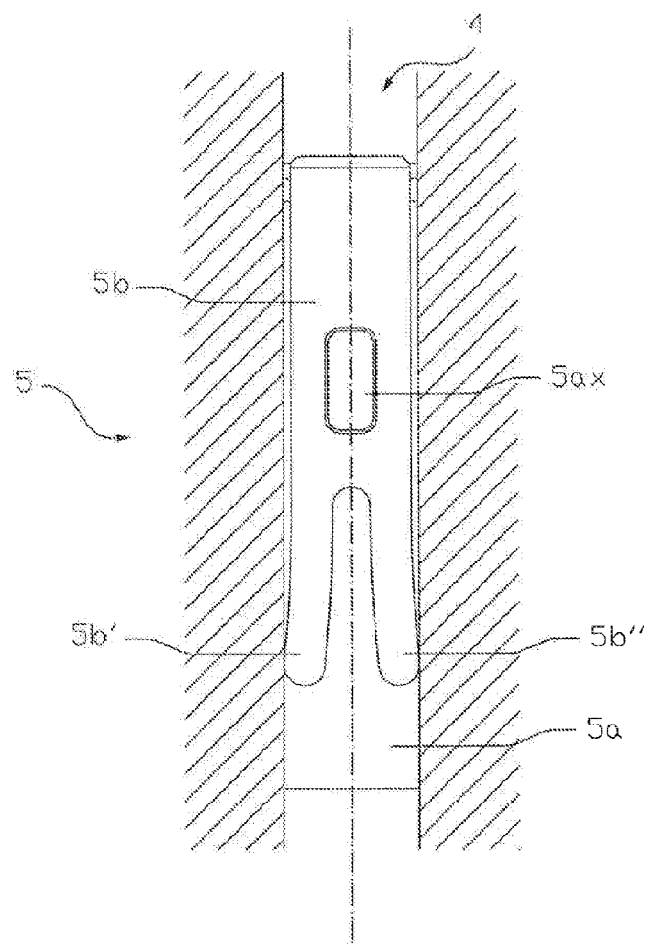
FIG. 4 shows the position and guidance of the attachment element of FIG. 3 in the groove of the linear guide.

FIG. 4 illustrates the arrangement of a wing element of the attachment element 5b in a groove 4. The width of the wing at the regions of the attachment element 5b which are not formed by the extensions is smaller than the spacing of the groove flanks, that is to say the width of the groove. However, the difference between the width of the wing element and the width of the groove is illustrated in an exaggerated manner in FIG. 4 and serves merely for making the principle clearer. In practice, this difference is minimized, that is to say is set at the amount required for generating low friction. By the extensions 5b' and 5b" being pressed together when the wing elements are introduced into the groove 4, the free ends of these extensions always bear with an action of specific force against the groove flanks. For production reasons, the two groove flanks often do not run parallel to one another, but, instead, at a small angle. The result of this is that the groove width increases or decreases in the longitudinal direction of the groove. In this case, the width of the wing element in the front region is adapted to the smallest groove width, while the width of the wing element in the rear region is adapted to the maximum groove width in the displacement region of the linear guide, for example by the extensions being suitably spread apart. In the embodiment shown in FIGS. 2, 3 and 4, the two extensions 5b' and 5b" are in contact with the groove flanks over a small contact area only. To support the torque more effectively, the free ends of the extensions 5b' and 5b" may, however, also be shaped such that they have a greater contact region with the groove flanks.

The guide element presented in FIGS. 1 to 4 serves for supporting the torque in two diametrically opposite grooves 4 which are arranged in the spindle housing 3. It is not absolutely necessary to use two grooves 4, and instead the linear guide may also be implemented with only such a "tongue and groove connection". In cases where high torques have to be supported, however, it is recommended to use two and, where appropriate, even more than two corresponding "tongue and groove connections".

Contrary to the exemplary embodiment illustrated in FIGS. 2 to 4, the guide element 5 may also be formed in one piece, the guide element 5 in this case preferably either being manufactured monolithically in one piece from an elastic material (such as, for example, metal, plastic or a fiber material) or being produced as a composite body. In a version as a composite body, the guide element 5 may contain reinforcement inside the plastic body. In a further embodiment which may be combined with the embodiment having reinforcement, a metal spring is arranged inside the plastic body and imparts the necessary elasticity to the regions engaging into the groove 4 or grooves 4 of the linear guide. For example, the attachment element 5b of FIG. 3 may contain V- or U-shaped leaf springs, the legs of which are in each case arranged within two adjacent extensions 5b' and 5b". However, the spring may also extend over the head region of the attachment element, which head region connects the two elastic regions 5b designed as "wings". In this case, the legs of the spring are arranged within the "wings" and the web connecting the two legs is arranged within the head region.

Furthermore, the attachment element 5b may also be produced in multipart form, for example, from two halves which can be brought into a form fit, for example, via a snap connection. Of course, the individual parts of the attachment element 5b may also be joined together with the aid of other techniques, such as, for example, adhesive bonding, welding, soldering or the like. However, a mechanical connection of the two parts is not necessary, since, in a suitable version, the parts can also be held in the intended position by the housing of the linear guide. The attachment body 5b may also be composed of more than two elements, for example of two wing elements for engagement in the grooves 4, which wing elements are held in the intended position via a head element.

Figure 5A:
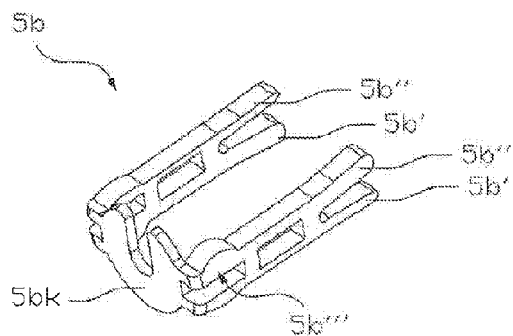
FIG. 5a shows an alternative version of an attachment element.

Furthermore, the elastic regions of the guide element 5 which engage into the grooves 4 may also be arranged on the side of said guide element 5, that is to say not toward one end of the guide element 5, as shown in FIGS. 2 and 3. A corresponding example is illustrated in FIG. 5a. In addition to the two extensions 5b' and 5b" at the free ends of the two "wings", the attachment element 5b also has a further elastic region 5b''' which is formed by a thickening of the respective "wing" at the join with the head region 5bk of the attachment element 5b, the thickening having a recess inside it.

Figure 5B:
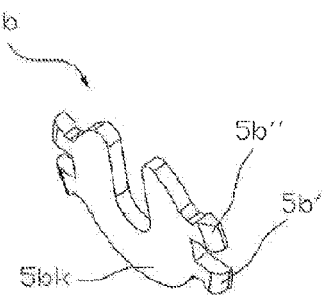
FIG. 5b shows a further alternative version of an attachment element.

Moreover, the elastic region may also be formed directly on the head end of the guide element 5, for example as extensions 5b' and 5b" of an attachment element 5b illustrated in FIG. 5b.

Figure 6:
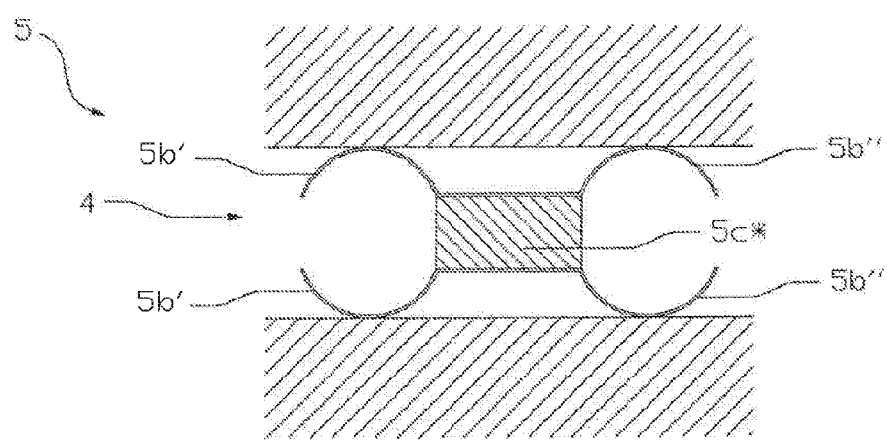
FIG. 6 shows a guide element, arranged in a groove, according to a further alternative embodiment.

The diagrammatical illustration of FIG. 6 shows a further alternative embodiment of a noise-minimized and oscillation-minimized linear guide. The guide element 5 in this case comprises a dog 5c*, the function of which is identical to that of the recess 5c of the guide element illustrated in FIG. 2. Instead of being a dog for the article to be displaced, the part 5c* may also be formed by part of the article to be displaced itself. The rectangular shape of the dog constitutes only one example, and not a binding shape. Two metal springs 5bf are attached to the part 5c* and are supported on the flanks of the groove 4. The springs 5bf may, but do not have to be, coated with plastic.

Figure 7:
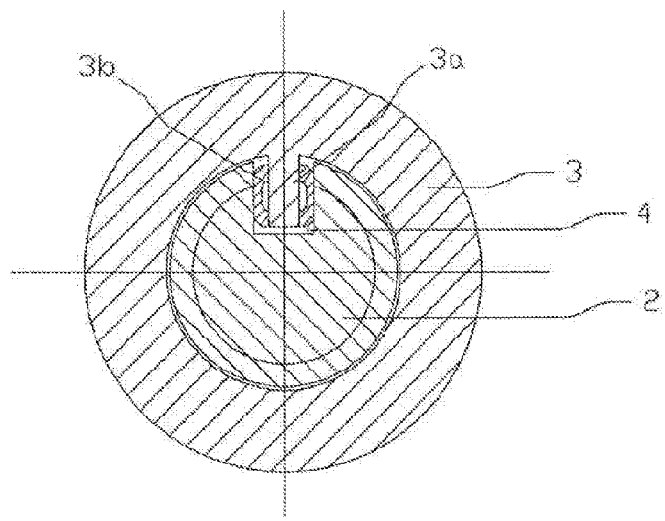
FIG. 7 shows a cross section through a linear guide in which the groove is arranged on the threaded spindle.

In another embodiment, the groove is not formed in the reference body of the spindle drive 10, that is to say, in the present case, in the spindle housing 3, but, instead, on the spindle, as illustrated in FIG. 7. Accordingly, in this embodiment, the guide element is formed on the reference body formed by the spindle housing 3. As may be gathered from the cross-sectional illustration of FIG. 7, the guide element (not given its own reference symbol here) has a web 3a which runs parallel to the spindle axis and forms the basic body of the guide element. The web may extend over the entire part of the spindle housing 3 as far as the spindle nut if the groove in the threaded spindle is designed with a corresponding length. One or more elastic element(s) 3b, the outer faces of which press against the groove flanks, are connected with a form fit to the web 3a.

Figure 8:
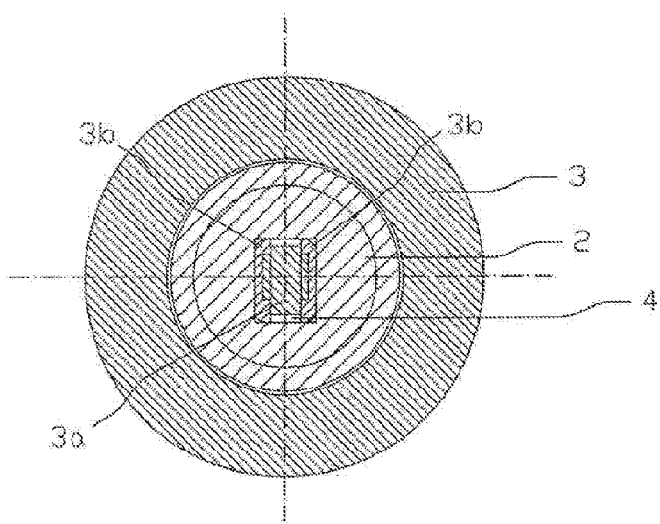
FIG. 8 shows a cross section through a linear guide in which the groove is arranged within the threaded spindle.

In the embodiment illustrated in FIG. 8, the groove is designed essentially as an axial orifice within the threaded spindle 2. A guide element formed from a rod-shaped basic body 3a with the elastic regions 3b attached to it engages on the end face into this orifice.

The elastic regions 3b or 5b, for example the attachment element illustrated in FIG. 3, may also be produced from a metallic material, such as, for example, spring steel.

In order to ensure lower friction on the groove flanks, however, at least the faces which are in contact with the groove flanks are preferably provided with a plastic.

The linear guide presented for a spindle drive makes it possible to compensate the play of that region of a guide element which is guided in a groove 4. This play compensation is achieved by means of an elastic design, for example by means of resilient ends of the region guided in the groove. Of course, other regions, such as, for example, the middle region, may also be designed resiliently. In the example illustrated in FIG. 7, the elastic region, guided in the groove, of the guide element is designed in the form of a hollow body produced from an elastic material. That region of the guide element which presses elastically against the groove flanks damps an oscillating movement of the spindle drive. Since this oscillating movement leads to a noise being generated and to increased wear, the linear guide presented both minimizes the generation of noise and reduces the wear.

LIST OF REFERENCE SYMBOLS

1 Spindle nut
2 Threaded spindle
3 Reference body
3a Basic body, shaped on the reference body, of the guide element
3b Elastic region of the guide element arranged on the reference body
4 Groove of the linear guide
5 Guide element of the linear guide
5a Basic body of the guide element
5ax Mounting projection
5b Elastic region of the guide element/attachment element
5b' First extension
5b" Second extension
5b''' Third elastic region
5bk Head region, head part
5bx Mounting recess
5bf Supporting spring
5c Mounting orifice of the guide element
5c* Dog
6 Drive
7 Gear
7a First gear wheel
7b Second gear wheel
8 Gear housing
9 Axis of the threaded spindle
10 Spindle drive

What is claimed is:
1. A spindle drive comprising:
a spindle nut;
a threaded spindle driven axially by rotation of the spindle nut and mounted fixedly in terms of rotation with reference to a reference body;
a linear guide having a groove, the axis of the threaded spindle being arranged parallel to the longitudinal direction of the linear guide so that the threaded spindle may travel axially through the linear guide, and
a guide element connected to the threaded spindle and travelling with the threaded spindle through the linear guide;
the guide element having a non-elastic body and an elastic element formed integrally with the non-elastic body, the elastic element comprising a fork-shaped arrangement of extensions that comprise free ends that are flexible to vary an outer width of the free ends transversely to the longitudinal direction of the linear guide,
wherein, in an operational state of the guide element, the elastic element of the guide element is spring-loaded and located within and slidably engaged with the groove of the linear guide, such that during a linear sliding of the guide element within the groove of the linear guide, the elastic element remains spring-loaded with the outer width of the free ends transverse to the longitudinal direction of the linear guide remaining within a maximum groove width in the region used for linear guidance of the elastic element of the guide element,
and wherein in a non-loaded state of the elastic element in which the guide element is removed from the groove guide, the outer width of the free ends transverse to the longitudinal direction of the linear guide is greater than the maximum groove width in the region used for linear guidance of the elastic element of the guide element.
2. The spindle drive according to claim 1, wherein the guide element comprises a basic body which is designed to be connectable with a form fit to the elastic element.
3. The spindle drive according to claim 1, wherein the linear guide comprises at least two grooves which are arranged parallel to one another and parallel to the axis of the threaded spindle.

4. The spindle drive according to claim 1, wherein the groove of the linear guide is arranged on the reference body and the guide element is arranged on the threaded spindle.

5. The spindle drive according to claim 1, wherein the faces of the guide element which are intended for contacting the side faces of the groove are designed as plastic surfaces.

6. A method for providing a spindle drive comprising
providing a spindle nut;
mounting a threaded spindle to be driven axially by rotation of the spindle nut and to be fixed against rotation,
arranging the axis of the threaded spindle parallel to the longitudinal direction of a linear guide, wherein the linear guide has a groove,
connecting a guide element to the threaded spindle to travel with the threaded spindle through the linear guide, the guide element having a non-elastic body and an elastic element formed integrally with the non-elastic body, the elastic element comprising a fork-shaped arrangement of two connected extensions that comprise flexible free ends that flex to vary an outer width of the free ends transverse to the longitudinal direction of the linear guide, and
arranging the elastic element of the guide element in a spring-loaded state within the groove of the linear guide, wherein during a linear sliding of the guide element within the groove of the linear guide, the elastic element remains spring-loaded with the outer width of the free ends transverse to the longitudinal direction of the linear guide remaining within a maximum groove width in the region used for linear guidance of the elastic element of the guide element, and
wherein in a non-loaded state of the elastic element in which the guide element is removed from the groove guide, the outer width of the free ends transverse to the longitudinal direction of the linear guide is greater than the maximum groove width in the region used for linear guidance elastic element of the guide element.

7. The method according to claim 6, further comprising designing a basic body of the guide element to be connectable with a form fit to the elastic element.

8. The method according to claim 6, further comprising arranging at least two grooves of the linear guide parallel to one another and parallel to the axis of the threaded spindle.

9. The method according to claim 6, further comprising arranging the groove of the linear guide on the reference body and arranging the guide element on the threaded spindle.

10. The method according to claim 6, further comprising designing the faces of the guide element which are intended for contacting the side faces of the groove as plastic surfaces.

11. A spindle drive comprising:
a spindle nut;
a threaded spindle driven axially in relation to a reference body by the rotation of the spindle nut and fixed against rotation;
the axis of the threaded spindle being arranged parallel to the longitudinal direction of a linear guide,
the linear guide having a groove; and
a guide element rigidly connected to the threaded spindle and travelling with the threaded spindle through the linear guide, the guide element engaging the groove as the guide element and the threaded spindle travel through the linear guide;
wherein the guide element comprises a spring element having two extensions which are connected to one another in a fork-shaped manner and are arranged such that, in a non-loaded state of the spring element, an outer spacing of the free ends of the extensions transverse to the longitudinal direction of the linear guide is greater than the groove width in the region used for linear guidance,
wherein the guide element comprises a basic body which is designed to be connectable with a form fit to an attachment element comprising the elastic region, and
wherein the linear guide comprises at least two grooves which are arranged parallel to one another and parallel to the axis of the threaded spindle.

12. The spindle drive according to claim 11, wherein the groove of the linear guide is arranged on the reference body and the guide element is arranged on the threaded spindle.

13. The spindle drive according to claim 11, wherein the faces of the guide element which are intended for contacting the side faces of the groove are designed as plastic surfaces.

* * * * *